United States Patent [19]

Schlosser

[11] 4,453,530

[45] Jun. 12, 1984

[54] OUTDOOR COOKING DEVICE

[75] Inventor: Erich J. Schlosser, Lindenhurst, Ill.

[73] Assignee: Weber-Stephen Products Co., Palatine, Ill.

[21] Appl. No.: 447,325

[22] Filed: Dec. 6, 1982

[51] Int. Cl.³ .............................................. F24B 3/00
[52] U.S. Cl. ............................ 126/25 R; 220/85 CH
[58] Field of Search ........................ 126/25 R, 41 R; 220/379, 85 CH

[56] References Cited

U.S. PATENT DOCUMENTS

| | | | |
|---|---|---|---|
| 678,024 | 7/1901 | Norris | 220/85 CH |
| 3,611,915 | 10/1971 | Glaser et al. | 126/25 |
| 3,714,937 | 2/1973 | Linstead | 126/25 |
| 3,734,076 | 5/1973 | Koziol | 126/25 |
| 4,390,002 | 6/1983 | Daily | 220/85 CH |

*Primary Examiner*—Carroll B. Dority, Jr.
*Attorney, Agent, or Firm*—Robert E. Wagner; Ralph R. Rath

[57] ABSTRACT

A cooking grill consisting of a bowl and a cover includes a support mechanism for supporting the cover on the bowl. The support mechanism includes diametrically-opposed T-shaped brackets that support the cover generally perpendicular to the rim in an open position and provide a partial shield for the cooking surface.

5 Claims, 7 Drawing Figures

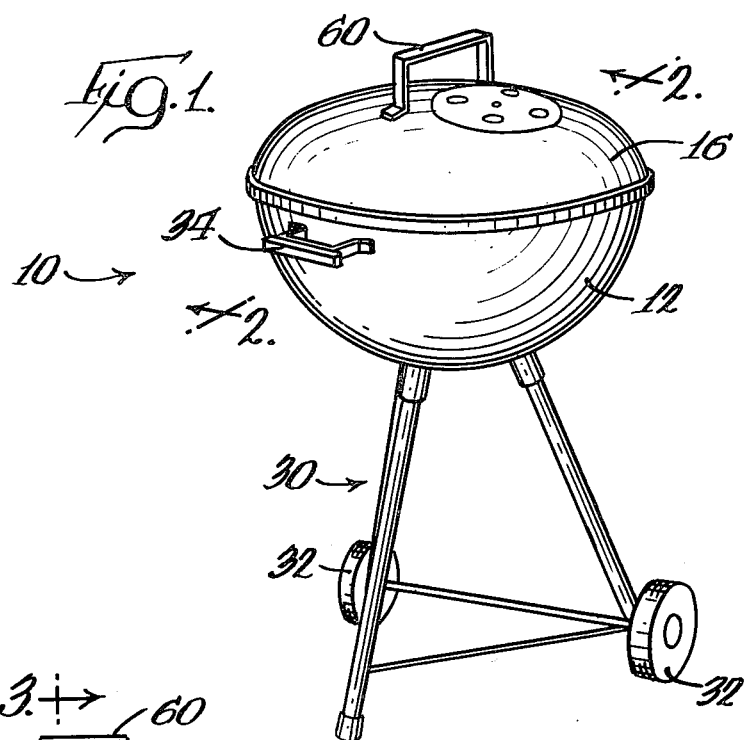
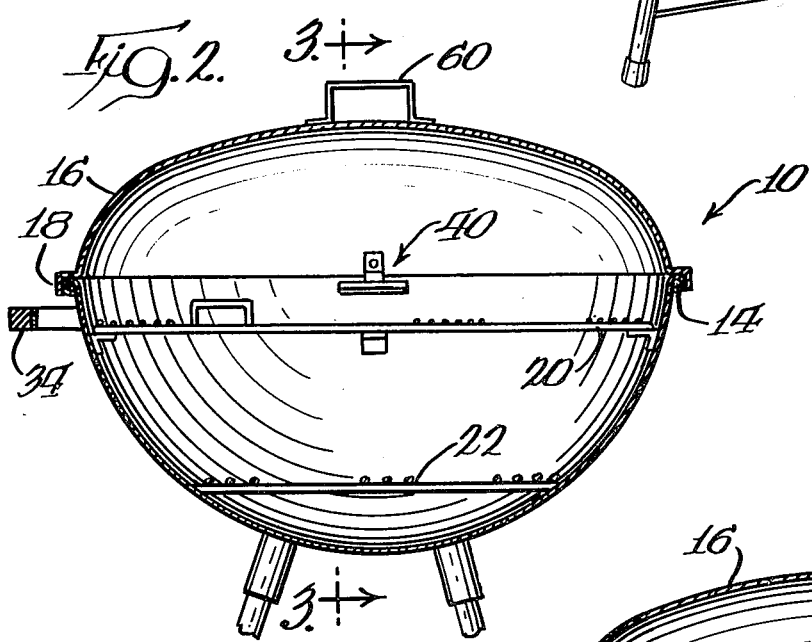
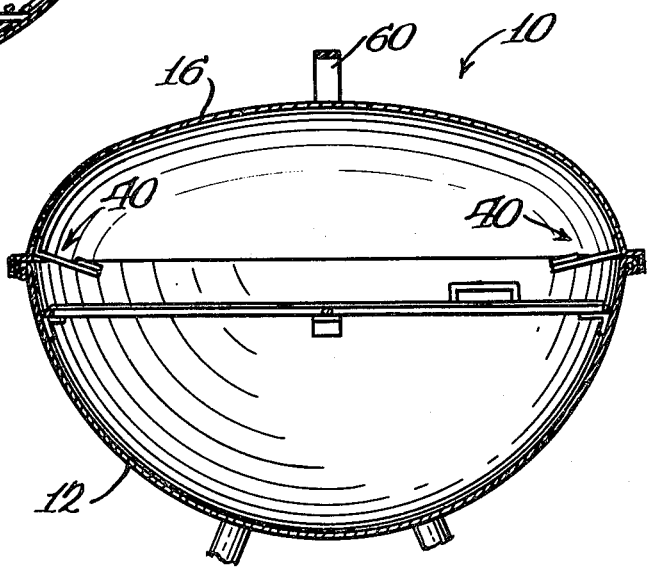

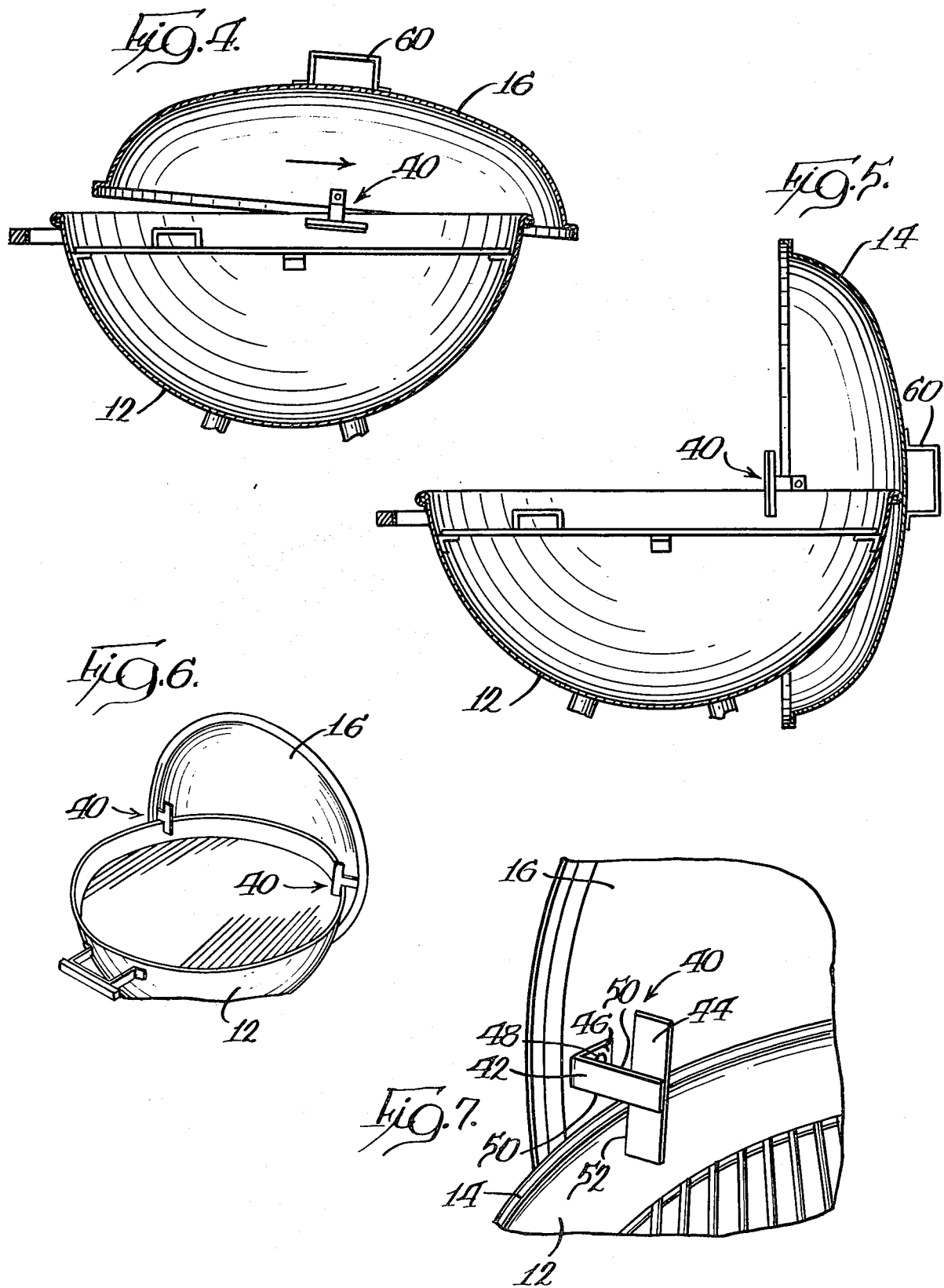

OUTDOOR COOKING DEVICE

DESCRIPTION

1. Technical Field

The present invention relates generally to cooking devices and more particularly to a cooking device having a lower base portion defining a cooking surface and a cover for enclosing an upper open end of the lower base portion.

2. Background of Prior Art

A cooking vessel for outdoor cooking has been in existence for decades. One of the most popular type of cooking vessels that is presently being marketed by the Assignee of the present invention is commonly referred to as a barbecue kettle. This cooking device consists of a generally hemispherical bowl that has a circular open top with a cooking surface located slightly below the upper edge or rim of the bowl. The bowl is supported on a tripod leg arrangement and has a cover for enclosing the cooking surface. The bowl and cover both have vent openings so that the cooking can be done while the cover is closed.

The cooking device presently being marketed by the assignee of the present invention also incorporates a hook that is generally C-shaped and is attached to an inner surface of the cover adjacent the periphery thereof so that the hook can be utilized to suspend the cover on the upper edge of the bowl.

While the present commercial structure has received a remarkable degree of commercial success, constant efforts are being made to upgrade and improve certain qualities of the cooking device.

SUMMARY OF THE INVENTION

According to the present invention, a cooking vessel includes a lower base portion or bowl that has an upper edge or rim surrounding the top opening and a cover for closing the open top of the base portion or bowl. The cover has opposed support brackets so that the cover can be supported generally perpendicular to the upper rim and approximately half of the cover is located above the rim to act as a shield in the event that cooking is to be done on the cooking surface with the cover opened.

More specifically, the opposed support brackets are generally T-shaped in configuration and extend inwardly from the inner surface of the cover generally towards each other so that, when the cover is supported in the open position, the base of the T engages the rim of the bowl while the opposite outer edge of one of the legs of the T engages the inner surface of the bowl below the rim to provide multi-point support for the cover on the bowl. The T-shaped configuration allows the user to grip an elongated handle on the outer surface of the cover and slide and tilt the cover so that the T-shaped brackets remain supported on the rim while the legs of the T ultimately engage the inner surface of the bowl.

According to one aspect of the invention, the elongated handle preferably has a predetermined angular orientation with respect to the opposed brackets so that the approximate location of the brackets can be ascertained merely by inspection of the handle while the cover is closed. This eliminates the need for lifting the cover off of the bowl to look for the position of the brackets within the cover.

BRIEF DESCRIPTION OF SEVERAL VIEWS OF DRAWINGS

FIG. 1 is a perspective view of a barbecue grill having the features of the present invention incorporated therein;

FIG. 2 is a cross-sectional view as viewed along line 2—2 of FIG. 1;

FIG. 3 is a cross-sectional view as viewed along line 3—3 of FIG. 2;

FIGS. 4 and 5 show the manipulative steps for moving the cover between the closed and open positions;

FIG. 6 is a perspective view of the kettle with the cover in the open position; and, FIG. 7 is an exploded fragmentary view showing the details of the bracket structure.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIG. 1 of the drawings discloses the cooking vessel having the present invention incorporated therein and generally designated by reference numeral 10. The cooking vessel or barbecue grill consists of a generally hemispherical bowl 12 that has a generally circular upper edge or rim 14. A cover 16 is dimensioned such that it will close and seal the upper open portion of the bowl 12 and has a sealing flange 18 for this purpose. The hemispherical bowl or lower portion 12 also has a first grill 20 that defines a cooking surface located slightly below the upper rim 14 and a second grill 22 that is adapted to support the cooking fuels, such as the charcoal.

Hemispherical bowl 12 is supported on a tripod leg arrangement 30, illustrated in FIG. 1, which has a pair of wheels 32 so that the entire unit can easily be moved about a patio by gripping a handle 34 located on the bowl 12.

According to the present invention, the cover 16 of the grill 10 has a novel support mechanism which allows the cover to be supported directly on the grill and at the same time act as a partial shield for the cooking surface. The support mechanism includes a pair of diametrically-opposed means or brackets 40 that are secured to the inner surface of the cover 16.

As illustrated in FIG. 7, each bracket means 40 includes a generally L-shaped base portion 42 having a cross-member 44 secured to the outer end of the leg thereof. The opposite leg of the L-shaped member 46 is connected by either a screw 48 or other means, such as welding, to the inner surface of the cover 16. The two elements 42 and 44 cooperate to define a generally T-shaped bracket structure that extends inwardly from the inner surface of cover 16.

The T-shaped bracket is dimensioned and designed such that it will guide the cover from a position illustrated in FIG. 4 to a position illustrated in FIG. 5 without entire removal of the cover, as will be explained later. It will be noted in FIG. 7 that the L-shaped leg 42 has opposed edges 50, while the cross-member 44 has an inner edge 52. These edges cooperate to guide inner surface of the bowl 12 to produce a multipoint contact and support the cover on the bowl. It should also be noted that approximately one-half of the cover extends above the rim 14 and will act as a shield to shield the cooking surface in the event there is any wind while the user is barbecuing food on the grill. Thus, by a simple structure, the cover can easily be supported on the bowl and can be moved from between open and closed positions without actually physically lifting the cover entirely off the bowl.

As explained above, an elongated handle 60 is located on cover 16 and has a predetermined angular orientation with respect to the brackets 40. As illustrated in FIGS. 2-5, the elongated handle extends perpendicular to a line between the diametrically-opposed brackets so that the movement of the cover along the axis of the handle, from the position illustrated in FIG. 4 to that illustrated in FIG. 5, will move the brackets along the inner surface of the bowl.

Of course, numerous modifications come to mind without departing from the spirit of the invention. For example, the T-shaped structure could be modified to some other configuration so long as the bracket structures are located in diametrically-opposed relationship so that the cover is supported without the use of any other extraneous fasteners or supporting elements.

I claim:

1. A cooking vessel comprising a base portion having an open top defined by an upper edge of said base portion and a cover for said base portion, said cover having opposed generally T-shaped, support brackets, said brackets being positioned such that sliding and tilting movement of said cover with respect to said open top will cause edges of said brackets to engage said upper edge and an inner surface of said base portion to suspend said cover generally perpendicular to said upper edge.

2. A cooking vessel as defined in claim 1, in which said cover has an elongated gripping handle having a predetermined angular orientation with respect to said support brackets so that the position of said brackets inside said cover can be determined from said handle.

3. A cooking vessel comprising a cooking bowl having a generally circular open top and a cover for enclosing said circular open top, said cover having a circular opening adjacent a bottom edge corresponding to said generally circular opening and diametrically opposed T-shaped hooks secured to an inner surface of said cover adjacent the circular opening for supporting said cover in a position generally perpendicualr to said open top.

4. A cooking grill comprising a generally hemispherical bowl having supporting legs and a generally circular open top, a generally hemispherical cover for closing said open top and support means for supporting said cover in an open position on said bowl, said support means including diametrically opposed T-shaped support elements extending inwardly from an inner surface of said cover and adapted to be supported on a edge defining said open top, said support elements cooperating to suspend said cover in a generally vertical orientation with respect to said bowl and act as a partial shield for a cooking surface in said bowl.

5. A cooking grill as defined in claim 4, in which opposite ends of said T-shaped brackets are accurate and are adapted to engage an inner surface of said bowl.

* * * * *